United States Patent [19]

Nickolas et al.

[11] 3,753,228

[45] Aug. 14, 1973

[54] SYNCHRONIZING ARRANGEMENT FOR DIGITAL DATA TRANSMISSION SYSTEMS

[75] Inventors: Andrew H. Nickolas, Penn Hills Township, Allegheny County; Harold R. Shaffer, Murrysville, both of Pa.

[73] Assignee: Westinghouse Air Brake Company, Swissvale, Pa.

[22] Filed: Dec. 29, 1971

[21] Appl. No.: 213,570

[52] U.S. Cl. .................... 340/146.1 D, 340/146.1 C

[51] Int. Cl. .............................................. H04l 7/08

[58] Field of Search .............. 340/146.1 D, 146.1 C, 340/172.5; 179/15 BS; 178/69.5 R

[56] References Cited

UNITED STATES PATENTS

| | | | |
|---|---|---|---|
| 3,144,515 | 8/1964 | Kaneko | 179/15 BS |
| 3,336,467 | 8/1967 | Frey, Jr. | 340/146.1 D |
| 3,473,150 | 10/1969 | McClelland | 340/146.1 D |
| 3,560,924 | 2/1971 | McBride | 340/146.1 D |
| 3,562,710 | 2/1971 | Halleck | 340/146.1 D |
| 3,689,899 | 9/1972 | Franaszek | 340/146.1 D |

*Primary Examiner*—Charles E. Atkinson
*Attorney*—H. A. Williamson, A. G. Williamson Jr. et al.

[57] ABSTRACT

To provide startup time to overcome initial transmission delays or faults in the communication channel or code apparatus of a digital data remote control system, which may cause loss of synchronization, selected SYNC bits are transmitted immediately preceding the initial data word in either direction between the system office and any station. These SYNC bits need not all be received for data decoding. Seven SYNC bits are transmitted preceding the initial word from the office, with the first five bits fixed in order as four spaces and one mark. The first bit of the three SYNC bits preceding a station first indication word is always a space. The penultimate and last SYNC bits for each direction have selected characters the same as and opposite to, respectively, the character of the final bit in the following word. Each code word comprises 21 data bits, i.e., addresses, instructions, functions, and ten BCH transmission check bits. The first or synchronizing and station address word from the office to a station also includes six synchronizing or tag bits of fixed character preselectively spaced throughout the data bits. These must be received and decoded in their fixed character as part of the transmitted data, in addition to the BCH check, for the received code word to be accepted. Following words to the same receiver do not include SYNC or tag bits.

7 Claims, 6 Drawing Figures

SYNCHRONIZING ARRANGEMENT FOR DIGITAL DATA TRANSMISSION SYSTEMS

BACKGROUND OF THE INVENTION

Our invention pertains to a synchronizing arrangement for digital data transmission systems. More specifically, this invention relates to an arrangement using an initial address word including a startup portion and synchronizing tag bits to synchronize the operations of the apparatus at the transmitting and receiving locations in a digital data coded remote control system.

The prior art coded remote control systems use code formats in which synchronizing is obtained by unique code portions or arrangement not appearing in the coded message. Such systems, however, require that the start of each coded message be correctly received at the addressed location. The data message may be rejected if the start portion of the message is incorrectly received. It has been found that the startup time of various transmission channels affects the synchronizing of the message. While this is not so important or critical in the slower speed transmission normally used in early control systems, the startup or delay time of the transmission channels becomes a critical factor as the transmission speed increases in bits per second. In other words, in the slower speed remote control systems where data transmission is measured in terms of tens of bits per second, or even less, channel delay is not as critical as it is in digital transmission systems measuring the transmission speed in hundreds or thousands of bits per second. In addition, the security checks necessary in such systems use up available message space. This, of course, reduces the effective bit transmission speed even when high bit rates of transmission are in use. The incorporation of a new security check arrangement to reduce the required number of bits for such checks increases the effective data transmission speed and thus the efficiency of the overall remote control system. One such improved transmission security check system is the well-known Bose-Chaudhuri-Hocquenghem security check, hereafter designated as the BCH security check arrangement.

Accordingly, an object of our invention is an improved means for obtaining synchronous digital data communication between a central control location and multiple remote controlled stations over a single communication channel or link.

Another object of our invention is an improved synchronizing word format for use as the initial word in a digital data transmission system over a signle communication channel.

A further object of the invention is an initial synchronizing word format for a digital data transmission system including six SYNC bits within the word format to assist in synchronizing the data transmission between a transmitter location and a plurality of receiver stations, while still transmitting useful data within the first word format.

It is also an object of our invention to provide a BCH security check arrangement for checking the proper transmission of the data bits in a digital data communication system.

Still another object of our invention is a synchronizing arrangement for a digital data link using a turn-on or startup word portion of selected format and bit length to precede the transmission of the initial word to accommodate startup delay time inherent in the transmission channel and avoid losing synchronization.

Yet another object of the invention is a synchronizing word format for a digital data link including a system startup word of selected length and format, a synchronizing word including a selected number of tag bits of preselected characteristic spaced throughout the word length, and a selected BCH check bit portion at the end of each transmitted word to check the synchronizing word transmission but not the startup word.

A further object of the invention is a synchronizing arrangement for a digital data transmission system operable to eliminate the system startup word from the synchronizing check at the receiving station and to cycle the received synchronizing word for a BCH security check.

Other objects, features, and advantages of our invention will become apparent from the following description when taken in connection with the accompanying drawings and the appended claims.

SUMMARY OF THE INVENTION

In providing transmission and word synchronization in our arrangement, various test bit patterns are included within the code word formats transmitted in each direction between a control office and the several stations. These test patterns include startup synchronizing bits transmitted preceding the first code word to or from each station, preselected tag bits within the data portion of the initial address word transmitted from the control office to each station, and the BCH transmission security check bits at the end of each code word. The startup or SYNC word used with office code transmission is longer in bit length than that used for the initial indication data transmissions from the remote stations. Each such startup word has a partly fixed bit characteristic pattern with the last two bits having a variable characteristic selected in accordance with the BCH transmission security check bits. In this manner, variations in communication channel startup times are accommodated. Such startup word synchronizing bits are added at the beginning of the initial word transmission in either direction, that is, the initial or synchronizing and station address word transmitted from an office to, and the initial indication data word transmitted from, a particular station. The first or address word transmitted from the control office is also used in synchronizing the overall system. Such synchronizing and address words include a station address portion, a portion containing an instruction regarding the existing mode of system operation, a word address portion at the selected station, and a word following bit, totalling 21 data bits in the specific arrangement described herein. The BCH transmission security check used in our arrangement adds ten additional bits, making a total of 31 bits in each data word transmitted. FOllowing words transmitted to the same station from the office do not require the station address and mode instruction portions but each data word transmitted includes a word address portion, the word following instruction bit, and the BCH check bits. These last check bits are obtained by cycling the data through a BCH generator register and into the shift register. The developed BCH bits are then added to the original data bits prior to code transmission to the station. It is to be noted that the data portion of the initial word from the office also contains various synchronizing tag bits in addition to the startup word which are positioned at preselected bit locations throughout the data part of the code and have preset characteristics.

Upon reception of this initial or address word at the selected station, all bits are stored in a data shift register in a serial fashion. After reception of a preselected number of bits (31 or more), a fast shift action cycles these stored bits through the BCH decoder unit and then back into the data shift register. However, the startup bits transmitted are so selected that they will not allow a good BCH check to be developed. Thus, the startup bits preceding the initial address word are discarded as more data bits are received at the station. Through the use of repeated BCH check cycles programmed into the apparatus, eventually a good BCH check is obtained when all 31 actual data bits have been properly received. The station receiver apparatus must also decode the operational mode instruction portion to determine what response is required. Of course, a station will not receive a particular code unless the address is that preselected for the station location. The word address portion is also decoded when an effective bit combination is received to determine which of several data function words at that station is to be acted or reported upon. Station indication codes do not include synchronizing tag bits within the data portion. However, a startup portion is transmitted, although fewer in bit number, preceding the first indication code from each station. All code word lengths are 31 bits with the final ten bits of all codes being the BCH check bits. Indication codes require no station address since stations reply only when selected by an office transmitted code containing that station's address. Reception of indication codes at the office location requires a similar cycling from the data shift register through the BCH decoder to eliminate the startup bits from the BCH check. Fewer recyclings are required, of course, since the startup bits are fewer in number.

DESCRIPTION OF THE DRAWINGS

In describing the illustrated arrangement in more detail, reference will be made to the accompanying drawings in which.

Where appropriate, similar references designate similar parts or elements of the apparatus or process in each of the drawings.

DESCRIPTION OF THE ILLUSTRATED EMBODIMENT

Figure 1:
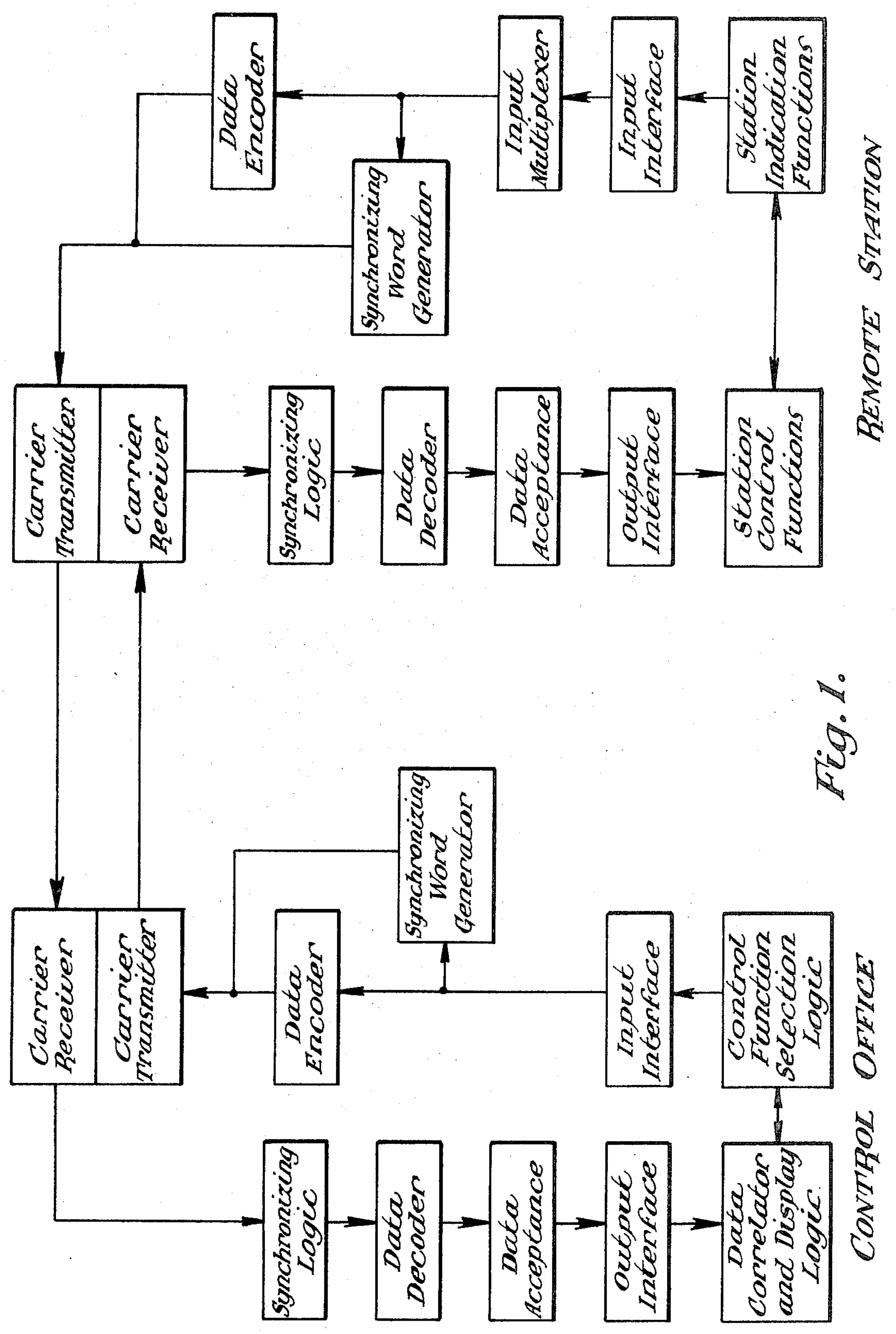
FIG. 1 is a block diagram illustration of a general type of remote control system which may embody the features of our invention.

Referring now to FIG. 1, we shall describe in general terms a basic remote control system embodying the novel features of our invention. All the apparatus in this illustration is designated by conventional blocks since various types of apparatus may be used to provide the desired operation. Novelty lies in the synchronizing feature of the code format and its processing and the details of the specific apparatus are not directly involved and thus need not be shown in detail. Preferably the apparatus is formed of integrated circuit elements although this is not a specific requirement. The control office and a single remotely located station are shown in FIG. 1 at the left and right, respectively. These locations are connected by a data transmission channel shown as being a carrier current communication system. Any type suitable to transmit digital type codes may be used. For example, a frequency shift carrier type transmission channel may be used. Further, the channel may be of the duplex or simplex type utilizing radio, microwave, or a cable path between the remote locations. Actually the remote control system is of the multi-station type normally provided in such installations, with the remote stations connected in multiple to the communication channel. Each station has a unique address, as will be discussed, so that only one station responds to each office code transmission depending upon the preselected station address portion of such codes.

Data to be transmitted from the office originates in the control function selection logic. Depending upon the form of the function logic in use, an appropriate interface element couples the logic to the data encoder. This encoder provides a digital type code for the data that is to be transmitted and the station selection or address code for the location to which the data or control function is to be transmitted. The encoder also generates a security check which herein is of the BCH type. The input interface also couples to the synchronizing word generator, which element generates the initial or startup synchronizing word or bits for transmission during the startup of the carrier system. The startup or synchronizing word bits are transmitted immediately preceding the first data code transmission in each cycle to a particular station. Subsequent word transmissions in sequence to the same station do not require synchronizing or startup bits. However, such a synchronizing bit pattern is transmitted prior to the initial data transmission to each of the stations of a multi-station system during each cycle of system operation. Both the synchronizing word generator and the data encoder are coupled to the carrier transmitter and function to transmit the synchronizing word bits and then the data word including the address words and other synchronizing bits and the BCH security check bits in digital word forms.

The transmitting apparatus at the remote station is similar in apparatus and function. The data or indication functions originate in the station indication function block and through an input interface are coupled to a multiplexer to convert the input into a word form suitable for encoding. The encoder and synchronizing word generator function in the same manner as the corresponding elements at the office except, as will be discussed later, the station startup synchronizing word has a shorter bit length than the corresponding synchronizing word from the office.

The code receiving apparatus chain is the same at the office and the station. Received codes are supplied by the carrier receiver to the synchronizing logic which synchronizes the local operation with that of the transmitting location. In this synchronizing function, the SYNC or startup word assists by allowing the receiving unit to overcome, that is, eliminate, any effects of the transmission channel delays. The data decoder and acceptance elements determine the station and/or the word addresses and check proper transmission by providing a BCH code check. The BCH check bits received must agree with those determined locally or the data code received is rejected. Again, an interface unit, designated as the output interface element, couples the data acceptance unit to the final output. At the office, this is a data handling or correlating element and display means while at the station, the output is delivered to the station control functions for registry and execution at that location.

Figure 2:
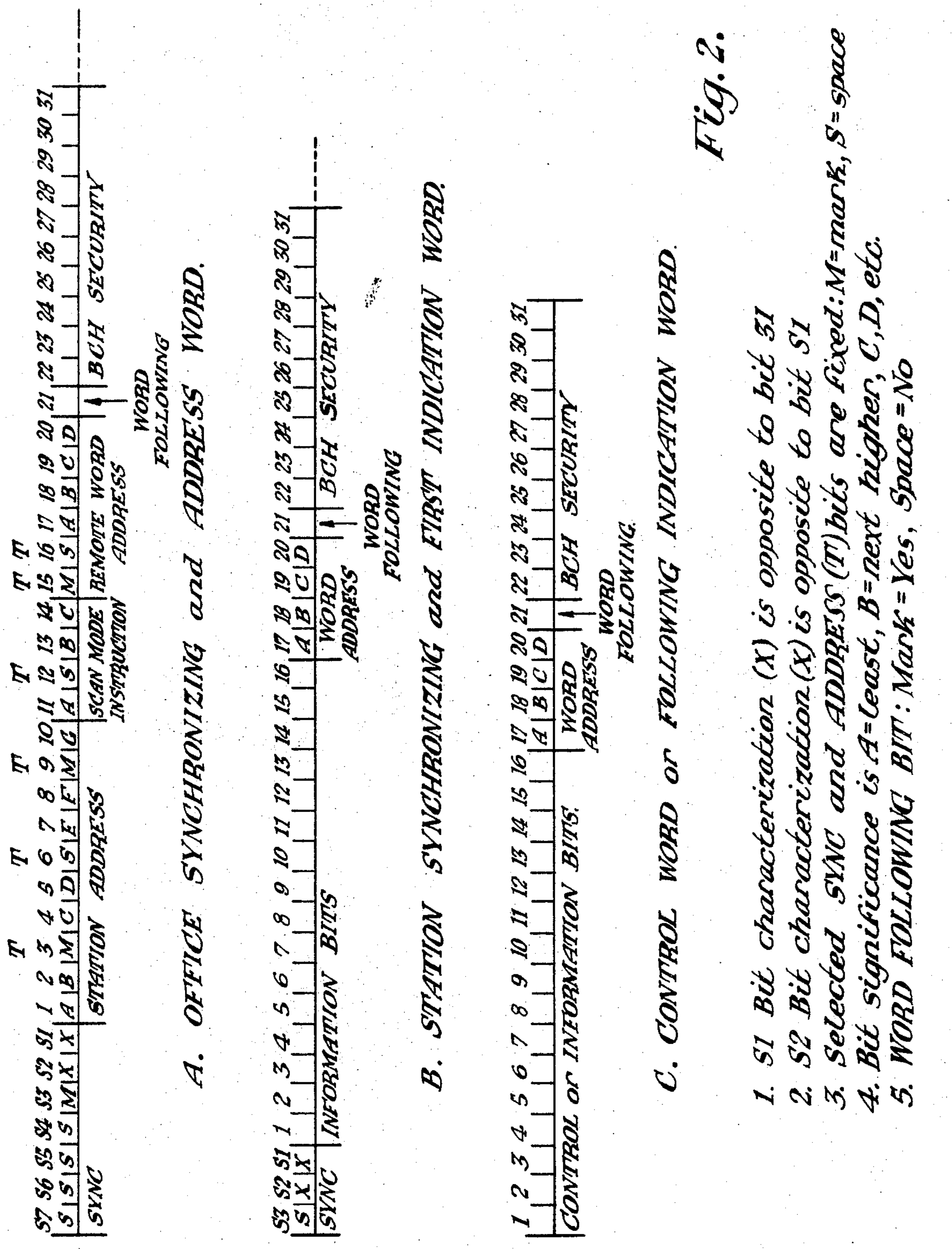
FIG. 2 is a chart arrangement showing various code formats used in the control system arrangement embodying our invention.

We shall now describe the several code formats used in the system as illustrated in the various charts of FIG. 2. Chart A shows a combined synchronizing and address word which is the first transmission from the office location to a particular station, during each cycle of operation, as communication is resumed or initiated with that particular station. This code format may or may not be immediately followed by a control word, such as shown in chart C, with the circumstances existing when a succession of control words is transmitted to a particular station being described later. It is to be noted that the office synchronizing and station address word transmitted from the office, exclusive of the startup or initial synchronizing (SYNC) bits, has a code word length of 31 bits, the final ten of which are the BCH transmission security check bits. This bit length holds for each of the various types of code formats exclusive of the synchronizing or SYNC bits. The SYNC or startup word portion comprises seven data bits designated as bits S7 to S1 in the descending order of serial transmission which begins at the left of chart A. The first four bits to be transmitted each have a fixed character which is, as illustrated, a space (S) or binary 0. The fifth SYNC bit, designated S3, also has a fixed character, being a mark or a binary 1, designated by M. For security check purposes, that is, to avoid a premature developing of a proper BCH check at the receiving location for the code received, the character of bit S1 is always selected to be opposite that of the final bit 31 of the address word, as is noted at the bottom of FIG. 2. Bit 31, of course, is the final bit of the BCH security check portion of each code. Thus, prior to completing the transmission of the SYNC word, the entire first or address word including the BCH check must be known. As will be described later, this is done during the transmission of the first part of the SYNC word by fast shift operations, as will be described in connection with FIGS. 3A and 3B, to develop the BCH security check bits prior to the time that bits S2 and S1 are transmitted. Also, as noted on FIG. 2 at the bottom, bit S2 is always set to be opposite bit S1 or, said in another way, bit S2's characterization is always the same as that of bit 31 of the address word.

The remaining 31 bits of this initial transmission from the office to a specific station form the station address word. As numbered in ascending order of transmission, these bits are divided into designated subportions as indicated, including bits 1 to 10 as the station address, bits 11 to 14 which are the scanning mode instructions to the station, bits 15 to 20 which comprise a remote word address at the selected station, and bit 21 which is a word following instruction. The final ten bits, 22 to 31, then comprise the BCH transmission security check for that particular code word. It will be noted that the word following bit is characterized in accordance with Note 5 at the bottom of FIG. 2. That is, if a second word to the same station address immediately follows, bit 21 is a mark but otherwise is characterized by a space. Interspersed among the first three sections of this code word are additional fixed synchronizing bits or tag bits, designated by the letter T. These are here specifically shown as being bits 3, 6, 9, 12, 15, and 16, but others among the first 20 bits could be preselected. These tag bits have a fixed character and are alternately marks and spaces as indicated in the code format chart. They are incorporated in the data word to assist in checking the correct transmission of the synchronizing and address word and are decoded as part of subword portion in which included. The other seven bits of the station address portion are selective in character in accordance with the remote station addressed. With seven variable bits, as shown, 128 station address combinations are possible. The letter symbols for these remaining bits of the first 10 designate the bit significance as designated by Note 4 at the bottom of FIG. 2.

The scan mode portion of the address word with its three variable bits informs the remote station addressed of the office unit's mode of operation and carries commands to direct, at least partially, the station apparatus in how to respond to the received data. A particular system may have several modes of operation which require different station responses. In one specific installation, five modes of operation are provided. Describing them briefly, the first and the normal mode is designated as a polling mode of operation. In this mode, the office sequentially scans or addresses the several remote locations in a predetermined sequence. When each station is addressed, if a data change has been stored for transmission to the office to update the various function indications or condition storages, an indication code is started and returned from the station. In this mode, each address word from the office contains the station address including the fixed bits, a word address that is all zero's (spaces) since no particular word at a station is desired, and the mode instruction bits selected to denote the polling mode. The word following bit in this mode is a 0 or space since no word immediately follows from the office for the same station.

A second operating mode is known as the control mode. Its purpose is to transmit control functions initiated at the office to the remote station unit addressed which will perform the desired operation. At least two words are always transmitted to the remote unit under this mode of operation, the initial address word and at least one control word. In the address word, shown in chart A, the station address portion contains the specific station address, the scanning mode instruction designates the control mode, the remote word address contains all zero's except for the fixed bits, and the word following bit is a mark indicating that a control word follows immediately. The following control word has the code format shown in chart C in which the word address designates the specific remote word at that selected location for which the control function is intended. The word following bit may be a space or a mark depending upon whether other control words are to immediately follow.

The third mode is an interrogate mode whose purpose is to force a selected indication word to be transmitted from the selected station unit. In this mode, the initial station address word in its word address portion contains the selected word address which is to be returned to the office. There is no following word so that bit 21 is a space. The scan mode portion designates the interrogate mode. The fourth operating mode is the master mode which is used when transmission of all indication words from a selected remote unit is desired to update the office information. The station is addressed in that portion but the word address is all spaces since all words will be required, and only the scan mode command designates to the station that the master mode is in effect and that all words at that station are to be returned. There is no following word so again bit 21 is a space. Finally, in the common mode, the purpose is to transmit a control function to all remote stations simultaneously, normally a nonvital control function. In this situation, the initial address word contains all zero's in the station address except for the fixed bits since each remote unit will respond not only to its own address but to the all-zero station address. A word address is necessary since a specific word at each location is the destination of the control function. The scan mode bits designate the common mode and the word following bit is a space.

The remote word address portion of the code has already been mentioned. More specifically, the four variable bits of this portion of the address word designate a specific word or function at the selected station which is to be acted upon. Each remote station location normally has several functions which are controlled and/or indicated. They are defined as the remote words and are selected during the initial address word if communication with a specific one of the station words is desired. For example, as previously discussed, during the interrogate and common modes of operation, the initial address word from the office indicates the selected station remote word which is to be acted upon. If no specific word is desired, the word address in the initial code format consists of all spaces or binary zero's. This is the usual condition in the initial address and synchronizing word format. In any control or indication word or code, however, a specific word address is required in order to designate the final location for the control function or the origin of the word or condition being indicated. It will be noted that the word address portion in any of the code formats has the same purpose. A similar statement is true regarding the word following bit previously discussed which designates whether an immediately following word is to be transmitted from the same location to the already selected receiver. A specific example is the transmission of a control function immediately after a station is addressed by the station address word with the office in the control mode of operation.

The final ten bits of the address word, and incidentally of each code format, comprise the BCH transmission security check bits or words. The characteristics of these final ten bits indicate the combination of marks and spaces transmitted during the first 21 bits of the corresponding data word. This is a conventional code transmission security check arrangement and the character of the bits in combination results from the shifting of the first 21 data bits through a BCH generator element, as will be subsequently described.

The purpose of the initial or startup SYNC word transmitted immediately ahead of the office station address word is to provide turn-on time for the transmission or communication channel. In this way, lost data coding due to distortion or initial transmission delays and similar incidents in the transmission system is eliminated. In the specific showing, the office to remote station address and synchronizing word allows the first four SYNC bits for a system startup. If no bits are lost due to channel delays, the check is perhaps redundant but a valid system security results from this method. The station synchronizing and indication word format shown in chart B also includes an initial startup word or bits but of shorter length. In other words, as specifically shown, only three bits, the first fixed and the second and third variable, are provided in the station synchronizing and first indication word. As indicated, bits S1 and S2 of the station indication word are characterized in the same manner as those of the office initial word. That is, bit S1 is of opposite character to word bit 31, the final BCH check bit of the same code, and bit S2 is then opposite to bit S1 in character. The lengths of the two startup or SYNC word bit groups are selected in accordance with the overall delay and distortion factor of the specific communication channel used and this specific use of 7 and 3 bits, respectively, in the office and station words is not a limiting factor but merely an example of one installation.

Referring further to chart B of FIG. 2, which illustrates the station synchronizing and first indication word, it is to be noted that the first 16 bits of the indication word, that is, after the SYNC word bits, are information or indication bits carrying information regarding the condition or position of specific apparatus or functions at the station. The next 4 bits, that is, 17 through 20, of this word designate the station word address to which the information transmitted applies. No station address is needed in transmissions from a station since each station transmits information or indications to the office location only when it has been specifically selected by an office code, that is, by a station address word transmitted from the office. It will be recalled, however, that during the common operating mode, as previously described, no indication codes are returned. The 21st bit in the indication word designates whether or not a second or following indication word is to be immediately transmitted from the same station to the office and thus serves the same function as the 21st bit in the office codes. The final 10 bits of the station indication word of the 31 total bits are the BCH security check portion of the code. It is to be noted in chart C that control words or following indication words are comprised of 31 bits only, there being no synchronizing bits for startup and initial conditioning, since transmission is already in progress. A control word or following indication word is divided into the same bit groups as the 31 bits of the first indication word. The station selection is previously established and, if a control word is being transmitted, a scan mode instruction is not necessary. Thus the only required selection variance, other than the information or control function bits, is the remote word address involved.

Figure 3A:
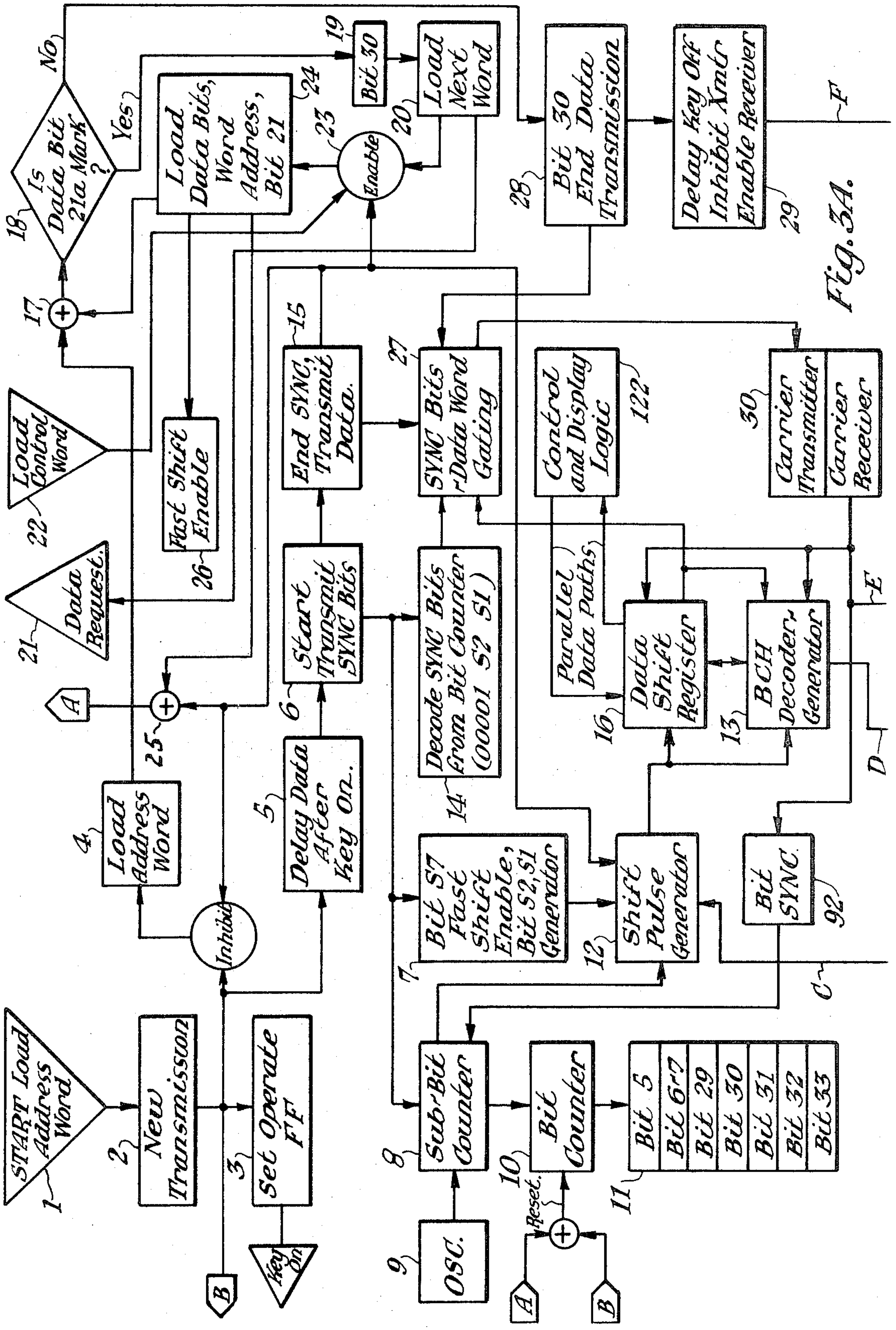
FIGS. 3A and 3B, when placed adjacent horizontally with FIG. 3A above, are a flow chart, using conventional symbols, of the process of code transmission and reception at a control office location in a remote control system embodying our invention.
Figure 3B:
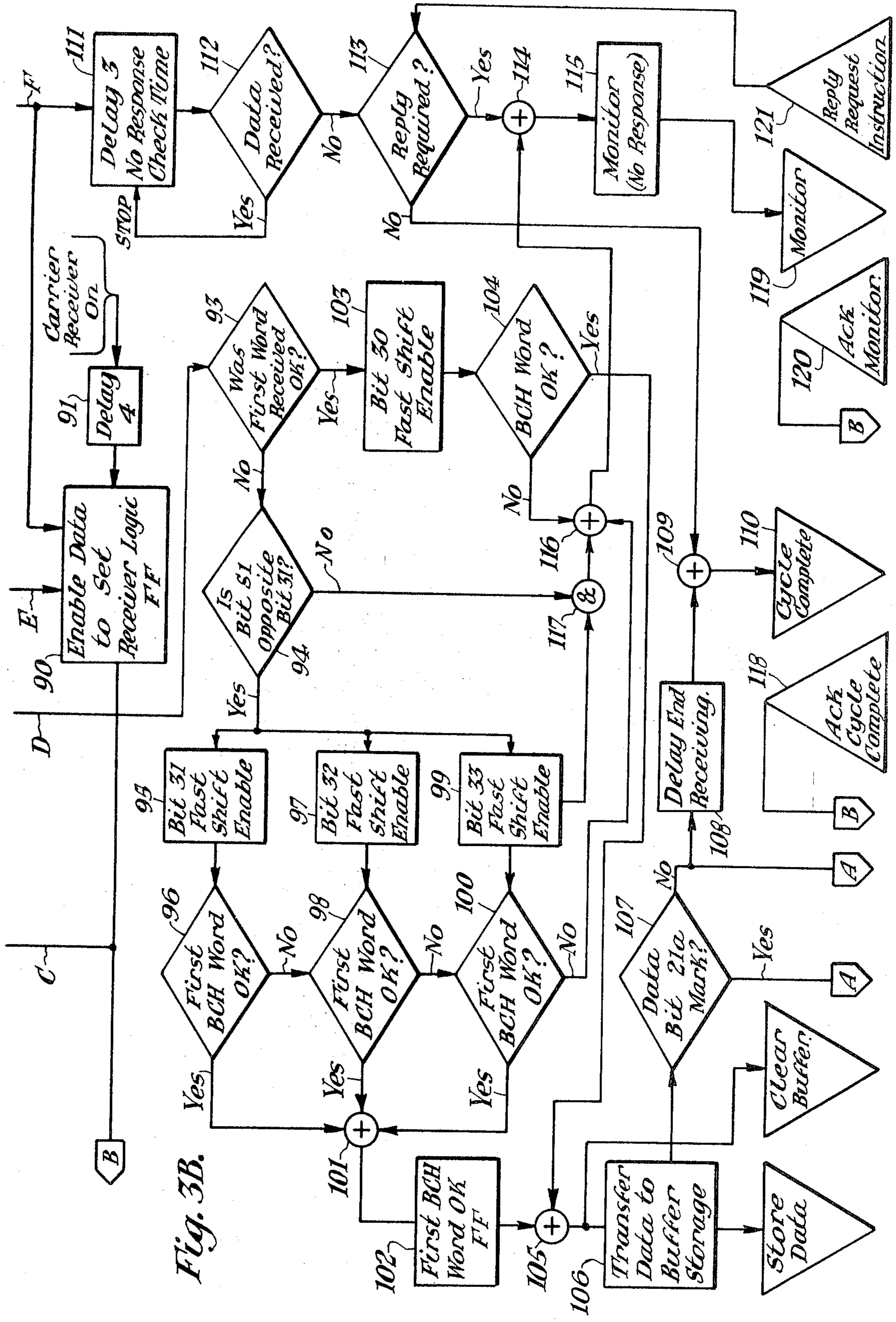

Referring now to FIGS. 3 and 4, we shall describe the general operation of the arrangement embodying our invention with reference to the flow charts illustrated in these two drawing figures. It is to be noted that the office code unit flow chart in FIGS. 3A and 3B, when placed adjacent with 3A at the top and the connecting flow lines C, D, E, and F matching, encompasses all the process operations which occur, during data transmission from the control office portion of FIG. 1, in the data encoder and synchronizing word generator, that is, between the input interface and the carrier transmitter, and also, during the reception of data, these actions which occur in the synchronizing logic, the data decoder, and the data acceptance elements between the carrier receiver and the output interface. The process begins in the upper left at reference 1 by the entry of a request or intent of loading of the address word for a new transmission, indicated at reference 2, which in turn sets the operate flip-flop, reference 3. At this point in the procedure, a unit reset pulse through the output block labeled B assures the reset of the code unit elements. For example, note the reset input to bit counter 10 from common connection block B through an OR gate. At the same time that the operating flip-flop is set, the loading of the address word is enabled, as illustrated at block 4, and the address word is loaded into the data shift register, reference 16, from the control logic, block 122, through the input interface as illustrated in block form in FIG. 1.

The setting of the operate flip-flop supplies the key-on signal to initiate further operation. Also, the delay period for data held in storage after the key-on time is instituted, as shown in block 5. When the data delay is completed, it is followed by the initiation of the transmission of the seven synchronizing bits, that is, the first seven bits preceding the address word. This transmission start of the SYNC bits (reference 6) enables a fast shift (7) by the shift pulse generator 12 of the data bits stored in the data shift register 16. These bits are shifted through the BCH generator element 13 and back into the shift register to develop the BCH check bits and thus also determine the character of SYNC bits S2 and S1 of the synchronizing and address word. An oscillator, reference 9, supplies basic counting pulses through a sub-bit counter, item 8, to the shift pulse generator 12. Bit counter 10 is also driven by an output from the sub-bit counter to provide a specific output signal at each of the indicated counts of the divided block, reference 11. It may be noted that the bit counter receives reset signals through an OR gate from input A or B, that is, the bit counter or unit reset connections, respectively. These input blocks correspond to the similarly designated output blocks shown elsewhere in this flow chart.

The shift pulse generator, reference 12, provides shift pulses to the data shift register and the BCH generator and decoder unit 13. When enabled for a fast shift generation, the shift pulse generator drives the data stored in the shift register through the BCH generator to derive the BCH check bits. The 21 data bits originally coming from the control logic are shifted through the BCH generator and reentered into the data shift register, reference 16, being shifted into the first 21 stages of this shift register. Following this, the 10 BCH bits are dumped into the final stages of the 31 bit shift register to form the address word. Meanwhile the 7 bit SYNC word, reference 14, is transferred through gating means, reference 27, to the carrier transmitter shown in the divided block, reference 30, which compares with the carrier transmitter and carrier receiver element shown in FIG. 1. The character of bits S2 and S1 is established when the BCH check bits are determined with bit S1 being opposite in character to bit 31 of the address word and bit S2 being of the same character as bit 31. As previously mentioned, the first four SYNC bits have a space or binary 0 character and the fifth SYNC bit has a binary 1 or mark character, the character of these five bits being fixed. When the end of the transmission of the SYNC bits is signaled, reference 15, gete means 27 is then opened for serially transferring the address word, comprising the 21 data bits and the 10 BCH bits, from register 16 to the carrier transmitter as shown.

During the time for transmitting the SYNC bits and developing the BCH check bits, the address word bit 21 is checked for its mark or space characteristic. The flow here is through OR gate 17 to the testing step or query block 18. If bit 21, that is, the word following bit, has a mark character and provides a YES output, the transmission of bit 30, block 19, actuates the load-next-word request, block 20, and a data request output at block 21 is transferred to the control function logic (see FIG. 1). When the next word is ready, a load-control-word signal input (22) enables gate 23 so that the step at block 24 is performed to load data bits, the word address, and bit 21 into the data shift register element 16. Note that this step of loading the next word also supplies through OR gate 25 and block connections A a bit counter reset pulse. A fast shift operation is also enabled, block 26, in order to develop the BCH check bits for this next word by the transfer action of the data bits through the BCH generator and back into the data shift register, elements 13 and 16, respectively.

The transmission of this following control word is similar to that of the synchronizing and address word except that there are no SYNC bits preceding the word transmission (see chart C). From block 24 through gate 17, bit 21 of this following word is checked for its character. If it is again a mark to indicate that a second following word will be transmitted, the cycle repeats upon the transmission of bit 30 of the control word to load and transmit the next word. However, if bit 21 has a space character, that is, a NO output from the query block 18 results, then the transmission of bit 30 ends the transmission of the data, a signal being supplied (block 28) to close the SYNC and data gating element 27. At block 29, the end of data transmission also delays the key-off and inhibits the transmitter and enables the receiver to prepare for an incoming transmission from the station addressed. Reception of an incoming code by the office code unit will be discussed subsequent to the following description of the operation of the field location in receiving the address and control code transmissions just described.

Figure 4A:
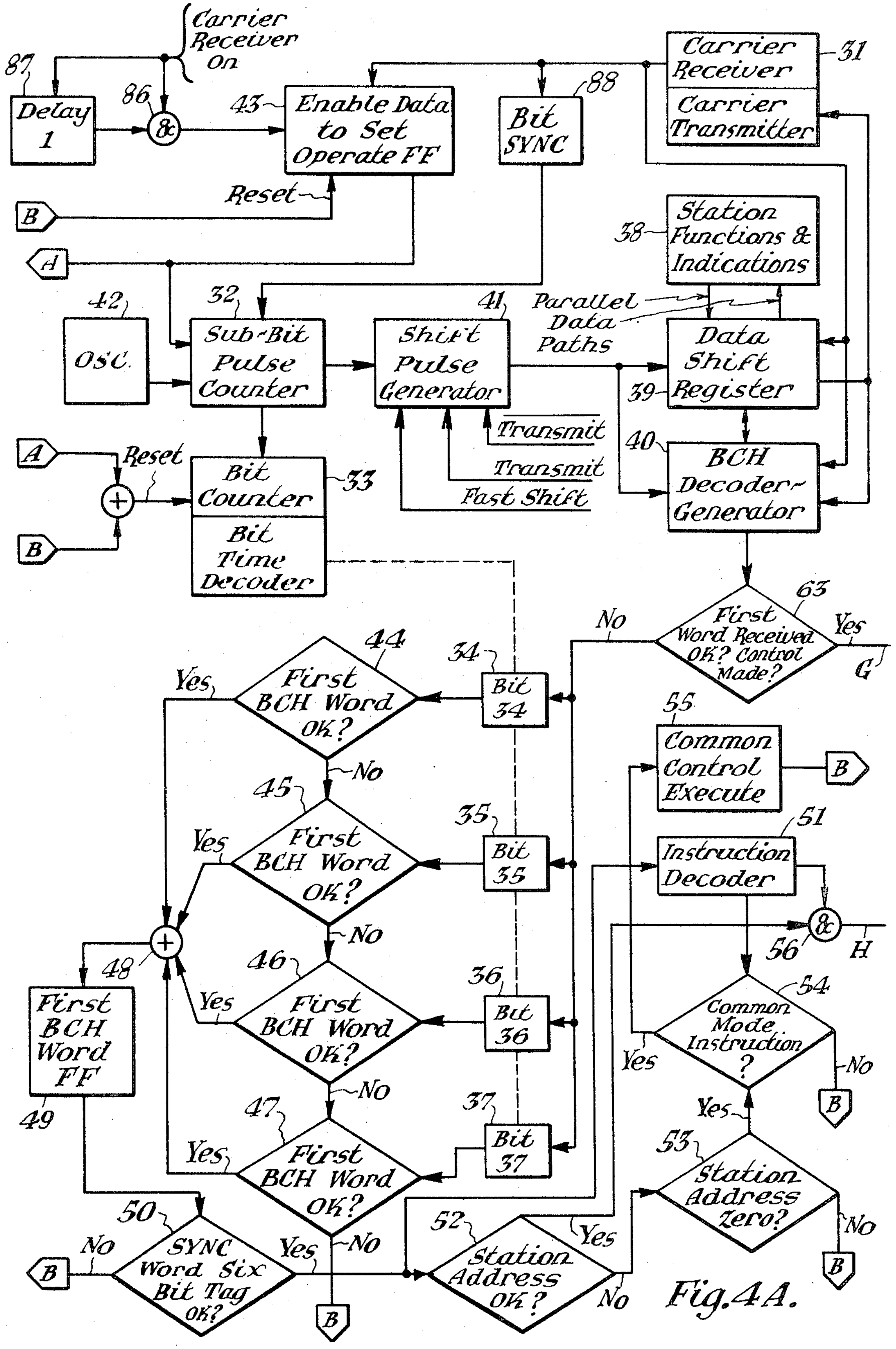
FIGS. 4A and 4B, when placed adjacent vertically with FIG. 4A to the left, provide a similar flow chart of the process of reception and transmission of codes from a single one of the remote station locations in a system embodying our invention.
Figure 4B:
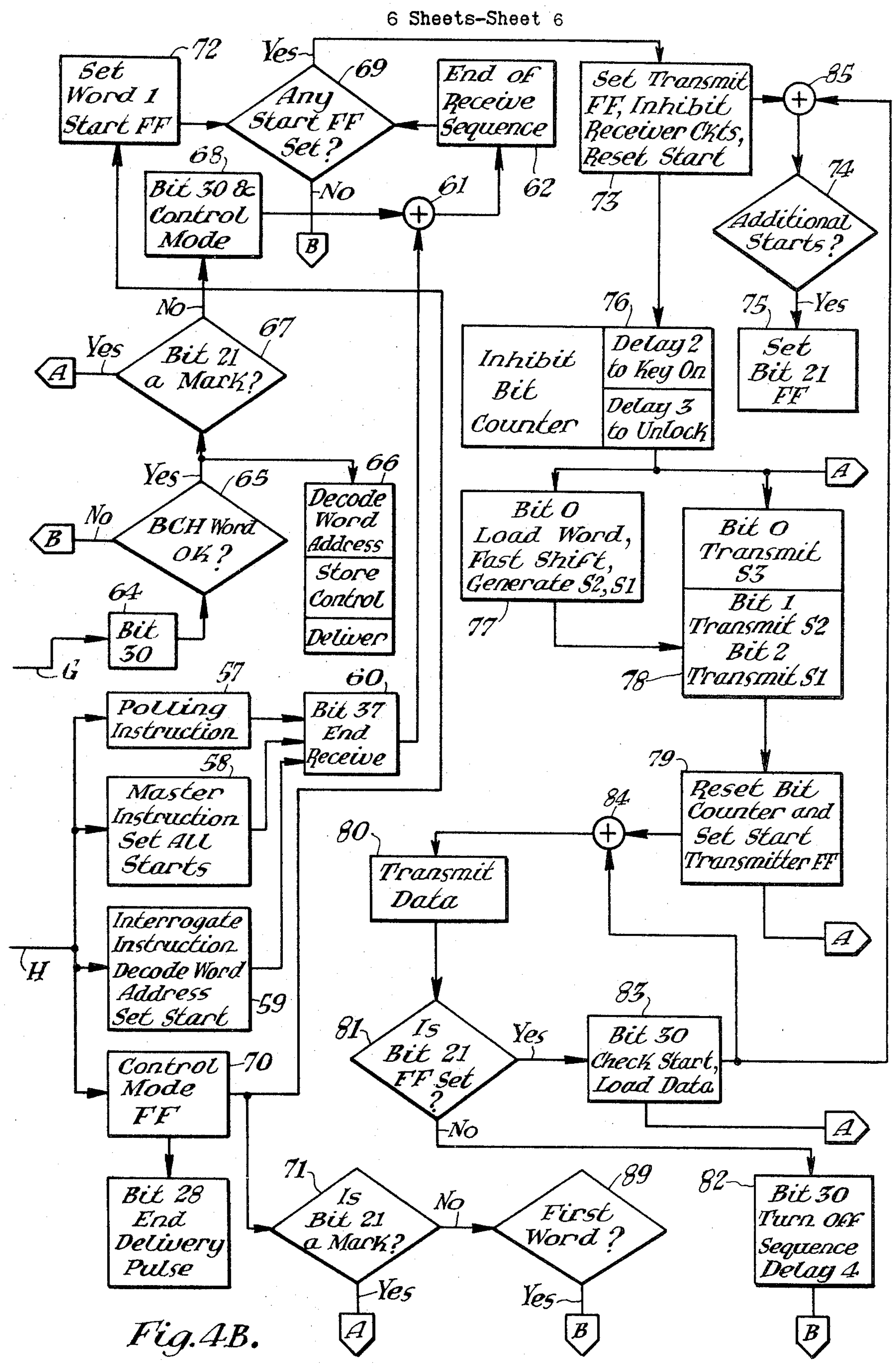

Turning now to FIGS. 4A and 4B, we shall describe the process of receiving the code transmitted from the office by the code unit at the station location, and subsequently the transmission of a return code from the station to the office location. The flow chart of FIGS. 4A and 4B, when placed adjacent with FIG. 4A to the left and flow lines G and H matching, illustrates the operations occurring in the remote station code unit which includes, from the block diagram of FIG. 1, the receiving elements between the carrier receiver and the output interface blocks and, for transmitting, the data encoder and synchronizing word generator elements.

The codes transmitted from the office apparatus are received over the communication channel by the carrier receiver illustrated as part of block 31 in FIG. 4A.

This is the equivalent of the carrier transmitter and receiver apparatus at the remote station illustrated in the block diagram of FIG. 1. If the carrier receiver is on, so that signals are provided to AND gate 86, at the end of a delay period established by block 87, to enable the data reception signal from the receiver to set the operating flip-flop, as illustrated by block 43, then the received data word can be entered into the data shift register (block 39). The fast shift signal input to the shift pulse generator, block 41, causes a fast shift of the data bits from the data shift register 39 through the BCH decoder element 40 and back into the data shift register 39. During this fast shift operation, the BCH decoder element develops a check on the proper transmission of the code. This is the transmission security check and a received code will not be accepted unless the BCH check under these conditions develops the proper output. It should be noted that the clock input to the shift pulse generator 41 comes from an oscillator 42 through a sub-bit pulse counter element 32, providing that the proper inputs from the operating flip-flop set by element 43 and the bit SYNC signal from block 88 are received by the sub-bit counter. The second output from the sub-bit pulse counter 32 is provided to the bit counter element 33 which was reset at the time of the setting of the operate flop-flop through the channel designated by the block A connections, from block 43 to block 33, through an OR gate. The bit counter, among other outputs, provides, from its bit time decoder, the specific count signals shown by the blocks connected by a dotted line and designated as 34, 35, 36, and 37, each reference numeral corresponding to the bit number at which the output occurs.

At the end of the BCH check cycle, all stages of the BCH decoder register should be in a specific reset condition to indicate a proper code check. However, since the initial synchronizing and address word transmitted from the office to a station has a startup portion of seven SYNC bits, the data shift register may fill with 31 bits in a serial fashion from the carrier receiver prior to the end of the actual address word. Thus several fast shift actions may be necessary in order to satisfactorily provide a BCH check of proper transmission of the address word. Therefore, such BCH check cycles are performed during the reception of the 34th to 37th bits, as represented by the output from the bit counter in blocks 34, 35, 36, and 37. As each such bit is received, a fast shift operation is performed to transfer the data bits then existing in the data shift register through the BCH decoder and back into the shift register. Such fast shift operations are at a bit transfer speed which enables it to be done during the reception of a single bit from the carrier channel. Each shift operation is checked by the query block associated with the corresponding bit output from the bit counter, that is, blocks 44, 45, 46, and 47, each of which asks the question in the process "Is the first BCH work OK?," checking back to the BCH decoder. It is to be noted that the first query block 63 below the BCH decoder is effective on subsequent control words where synchronizing bits are not present. Thus during the reception of the first word from the office, the output from block 63 must of necessity be NO since no check of the proper reception of this first word is possible at this point in the process. If no proper BCH check is ever developed, the code unit is reset by the NO output signal of block 47 through block connections B back to the reset terminals of the bit counter and operate FF. However, as soon as a proper BCH check is achieved during any one of the bits, the YES output from any one of the blocks 44, 45, 46, and 47 through OR gate 48 provides a signal for setting the first BCH work OK flip-flop (block 49). This institutes a check of the 6 tag bits in the address word. As previously described, these 6 tag bits are part of a code and thus must be received in the exact character combination designated in code chart A on FIG. 2. If this exact characterization is not received, a NO output from block 50 actuates a unit reset and the received code word is not accepted.

If the 6 tag bits check properly, so that a YES output occurs from the query block 50, the process continues, first to check (block 52) that the station address received is proper for that particular location, and in a simultaneous step (block 51) to decode the scan mode instruction contained in bits 11 to 14 of the received code. If the station address portion of the code is not the proper one for that particular location, so that a NO output occurs from block 52, and, in a subsequent query step, it is determined that the station address portion is not all binary zero's, the resulting NO output from that process block 53 actuates a unit reset (block B) and the station apparatus resets to await a subsequent code addressed to that particular station. If the station address portion is all binary zero's so that a YES output occurs from block 53, then a joint query process in block 54 occurs in which a check is made whether the instruction decoder has determined that the common mode of operation is active. If this is not so, the NO output from block 54 actuates a unit reset. However, if a common instruction mode is active so that a YES output occurs from block 54, the common control function received is then executed, as shown in block 55, following which the unit is reset to await a subsequent code.

If the station address is proper for that particular location so that a YES output from block 52 is provided, an AND gate 56 is then opened to pass the instruction decoded by block 51 over flow line H to be applied in accordance with the decoded mode instruction to block 57, 58, or 59 as the decoded mode instruction designates the polling, master, or interrogate mode. If the control mode is in effect, the process passes through block 70, which will be discussed later. Returning to the mode instructions in which there will be no following word, it is to be noted that, if a master mode instruction has been received, all station external start flip-flops are set (block 58) so that all remote word information will subsequently be returned to the control location. An interrogate instruction activates the process of decoding the received word address and sets the corresponding start flip-flop (block 59) so that the information from that word will be returned to the office. A polling instruction, of course, as will be described shortly, will activate the return of the information from any word for which the start flip-flop has been previously set to denote a change in that word since the last transmission. When bit 37 of the synchronizing and address word is received, after the process steps depending upon the mode instruction received, the next process step (block 60) activates an end-of-the-receiving action signal which is supplied through OR gate 61 to activate (block 62) and end-of-the-receiver sequence.

Returning now to the assumption that the code being received is a following control code word, the query process step at block 63 will find that the first word, that is, the station address word, was received OK and, the control mode having been determined, a YES output is provided over flow line G to block 64 so that, at bit 30, a check is made as to whether the BCH word bits are proper (block 65). The BCH check is, of course, accomplished in the fashion previously described. As usual, if the BCH check is not correct, the NO output from block 65 actuates a unit reset so that the code will not be accepted. However, assuming that the BCH word bits are proper, the YES output feeds both to the steps in block 66 and to another query in block 67 to determine again if bit 21, the word following bit, is a mark, i.e., a binary 1, to indicate a following code word. In block 66 it will be noted that the word address in the control word is decoded, the control function is stored and then delivered to the station control function elements, shown in FIG. 1 at the remote station. If another control function word is following, the YES output from block 67, of course, will actuate a bit counter reset to prepare for the reception of the following word. If the word following bit query in block 67 determines that bit 21 is a space so that there is no following word, and since the control mode has already been determined, upon the occurrence of bit 30 (block 68), the NO signal from block 67 passes through OR gate 61, previously mentioned, to block 62 for ending the receiving sequence. It will be noted, of course, that the reference numbers do not necessarily follow in operating or process sequence but have been assigned to avoid any repetition or dual references for elements of the flow chart.

With the end of the receiving sequence determined, the next step is a query, as indicated in block 69, as to whether any start flip-flops are set. These are the external flip-flops which are set when a change has occurred in an indication function which must be reported to the control office by an indication code. If no external start flip-flop is set so that a NO output results from block 69, a unit reset occurs and the apparatus is prepared for receiving subsequent codes at a later time. A second channel exists in the flow chart for reaching this block 69. It was previously noted that, when the instruction decoder output is passed through gate 56 upon the reception of a proper station address and a control mode has been determined, the output from block 51 actuates a setting of the control mode flip-flop at block 70. The setting of this flip-flop actuates, during the following code, an end of the delivery pulse when bit 28 occurs, which halts the control function delivery indicated in block 66. Following the setting of the control mode flip-flop in block 70, a query is made as indicated in block 71 as to whether the word following bit 21 has a mark characteristic. Normally, this will be a YES output, since with the control mode there will be a control word following, and a bit counter reset is actuated. If a NO output from block 71 occurs, a check is made as to whether this is the first or synchronizing and station address word reception. Since the NO output from block 71 is obviously an error if a control mode condition exists and it is the first word, then a YES output from block 89 will actuate a unit reset to await a correction action from the control location. A second flow from box 70 goes to block 72 in which the start flip-flop for word No. 1 is set to actuate a return indication code at the proper time. The output from box 72 is also fed to query block 69 so that, since a start flip-flop is now set when the process reaches block 69, a YES output will then be applied to block 73 which sets the transmit flip-flop and inhibits the receiver circuit. It also resets the start flip-flop that is set.

When the transmit flip-flop is set, an immediate check is also made through OR gate 85 to query, at block 74, whether any additional starts exist. If the output is YES, then bit 21 flip-flop is set so that this bit in the first indication code will have a mark characteristic to indicate that there will be additional indication codes following. With the setting of the transmit flip-flop to initiate the transmission of indication codes, after some delay actions indicated in block 76 for the purposes shown and the inhibiting of the bit counter temporarily, the data word which is to be transmitted is loaded, as indicated in block 77, into the data shift register 39. This occurs from the station indication functions through the input interface and the input multiplexer, as indicated in FIG. 1, into the coding unit. The signal which directs the loading of the data word into the data shift register also actuates the reset of the bit counter which is then enabled to operate in its proper fashion. The fast shift of the data in shift register 39 is also enabled so that the shift pulse generator drives the data bits through BCH generator 40 and returns them into the data shift register 39. Meanwhile, a BCH code check is developed for this first indication word and then is shifted into the data shift register as the final ten bits of the code word. This fast shift and the generation of the BCH code bits also generate the bit characteristic for bits S2 and S1 of this first synchronizing and indication word from the station. Reference is made to chart B in FIG. 2 for the code format which is being transmitted. In block 78 it is indicated that the first bit, that is, bit S3, is transmitted at this time having a characteristic of a space or binary 0 which is fixed. Bits S2 and S1 are then transmitted having the characteristic determined in accordance with the rules governing their relationship with the BCH check bits.

After the SYNC bits are transmitted, the bit counter is reset and the start transmitter flip-flop is set, as indicated in block 79. The bit counter reset signal is illustrated at the lower output of block 79 through the common connection A block. This start of the transmitter sends a signal through gate 84 to initiate (block 80) the transmitting of the indication word including the indication function and the word address, as shown in code format B in FIG. 2. During this transmission a query is made, as indicated in block 81, as to the condition of bit 21 flip-flop. If it is not set, so that a NO output occurs, then at bit 30 a turn-off sequence following a brief delay is initiated, indicated in block 82, followed by a unit reset pulse. If bit 21 flip-flop is set, the YES output from block 81, when bit 30 occurs, actuates loading the data for the next or following indication code word which will be loaded serially into the data shift register 39. The process then recycles through gate 84 to transmit the data steps for the following indication word which does not require, as indicated in format C of FIG. 2, any preceding SYNC bits. A check is also made from block 83 through gate 85 regarding the existence of additional starts, as indicated in query block 74. A YES output will set the bit 21 flip-flop to transmit a mark character in this second indication code word to designate that an additional or subsequent indication word will also be sent.

We shall return now to FIG. 3 to consider the office reception of the indication code or codes transmitted from the remote station. A code is received by the carrier receiver portion of block 30 over the communication channel. Reference may also be made to FIG. 1 for a further view of the channel relationships to the code apparatus. When the carrier receiver is turned on, an initial enabling signal is applied through delay block 91 to enabling block 90. The reception of an indication code by the carrier receiver holds the enabling action through flow line E to set the receiver logic flip-flop, as also noted in block 90. The enabling action designated in block 90 may also be completed or performed at the end of the office transmission by the output from block 29 through line F of the flow chart. This enabling action actuates a reset through blocks B to clear the bit counter in order to prepare for the reception of the indication code. The shift pulse generator is also activated by the output from block 90, through flow line C, to make it possible for the received code to be loaded serially from the carrier receiver into the data shift register 16. Also the bit synchronizing through block 92 activates the sub-bit counter 8 to determine the status of these synchronizing bits.

The shift pulse generator when so activated also initiates a fast shift action to cycle the data stored in the shift register 16 through the BCH decoder 13 and back into the shift register in order to check the BCH bits received for proper characterization. Since there is a three-bit SYNC word preceding the actual indication data word, more than one fast shift may be necessary in order to eliminate the SYNC bits S3, S2, and S1 from the BCH check. The sub-routine for repeating the fast shift cycle is handled by the process steps represented at the lower center and left of the flow chart. The BCH decoding action through flow line D initiates a query, as indicated in block 93, as to whether the first word was received OK. Since this is the first word and the final check can not now be made, a NO output results. In other words, the block 93 step is effectively only on following indication words. The NO output from block 93 activates the query step of block 94 which is an exclusive OR check as to whether bit 31 of the received code is of opposite character to SYNC bit S1 as received. It was previously described that SYNC bit S1 must be set opposite to the character of bit 31 in order to inhibit a good BCH check of a data bit storage in data shift register 16 which still includes one or more of the SYNC bits S3, S2, and S1. If bit S1 is not of opposite character to bit 31, a NO output from blcok 94 will cause an immediate halt to the code acceptance as will be explained shortly, this output being applied to an AND gate 117 which further enters into the process at a later point. Assuming that bit S1 is opposite in character to bit 31, the YES output from block 94 is then fed through the blocks 95, 97, and 99. As each of the indicated bits of the code is received, a fast shift is enabled and the first BCH word is checked by the associated query blocks 96, 98, and 100, respectively. Each fast shift generates such a BCH generator check and when the received SYNC bits, depending upon the transmission channel startup time, have been eliminated from the stored data in element 16, a YES output from one of the blocks 96, 98, or 100 is fed through OR gate 101 to set the first BCH word OK flip-flop, as indicated in block 102. A continued NO output from blocks 96, 98, and 100 will be sent back through an OR gate 116 to cause a halt in the code acceptance, as will be explained shortly.

If the code word being received is a following indication word with no SYNC bits, the query step indicated at block 93 will determine that the first word was received OK. Otherwise, coding action would have been halted previously. The YES output from this block, upon the reception of bit 30 of the code word, enables a fast shift action indicated in block 103 and a following BCH word check indicated in block 104. If the BCH word is not OK, the NO output is also applied to OR gate 116, to be explained shortly. However, the YES output from block 104 is supplied through OR gate 105. The other gate input here is from block 102 which dealt with the first BCH word check being OK. In either case, an output from gate 105 actuates the transfer of data to a buffer storage and from thence through the interface arrangements to the data correlator and display logic at the control office (FIG. 1), as indicated in block 106 with its corresponding output. Another output from gate 105 goes directly to clear any buffer storage registers which are part of the output interface.

The data being transferred to the external logic is also checked, as indicated in block 107, for the status of word bit 21. If this bit is a mark or binary 1, the YES output actuates a bit counter reset (block A) so that the apparatus is prepared for the reception of the following indication code word. If bit 21 is a space, the NO output from block 107 also initiates a bit counter reset and, after a delay period indicated by block 108, through OR gate 109 provides a cycle completed signal to the office external logic apparatus indicated in FIG. 1. The external logic apparatus, both the display and control function selection portions, jointly returns an acknowledgement of the cycle completed signal and this actuates a unit reset, as indicated at reference 118.

One other sub-process path remains for discussion. We noted that, after the transmission of a station address or control word is completed, the action indicated in block 29, through flow line F, enables the receiver logic. Other action is also taken, through a branch path to process block 111, which sets a delay for checking the reception or absence of response from the selected station location. During this delay time, the query indicated in block 112 checks for the reception of data from the station. If a code is received, the YES output stops the delay time and any further check action. If no response is received from the addressed station, a NO output from block 112 at the end of the delay time then actuates a query as to whether a reply was actually required. Another input to block 113 from the control logic, at reference 121, will indicate whether a reply was required by the transmitted instructions. If no reply was requested, the NO output from block 113 also feeds through gate 109 and a cycle completed signal is provided to the external logic at the office location. It will be remembered that a reply from the addressed station is required if a control function code has been transmitted or if the office apparatus was operating in the master or interrogate mode. No reply is required, of course, if the common mode of operation was in existence and, during the polling mode, there may or may not be a reply but none is actually required. If the YES output from block 113 results when a signal is applied from block 112, then the monitor step, indicated at block 115, is actuated through the OR gate 114. The monitor or no response signal is provided (reference 119) to the control logic at the office which sets a monitor period after which the transmission to that particular remote station may be repeated a preset number of times. The acknowledgement of the reception of the monitor signal from the external logic (reference 120) actuates a unit reset so that the apparatus at the office will be prepared to retransmit the station address or control word to the same station as soon as actuated by the external logic.

It is to be noted that, if bit 31 is not opposite to bit S1 of the first code word from the station, the NO signal from block 94 is passed through AND gate 117, when enabled by an output from block 99 upon the reception of bit 33, and then is applied through OR gates 116 and 114 to initiate a monitor signal. The final NO output from the first BCH word check sequence in blocks 96, 98, and 100 and the NO output from the BCH word check for following indication words from block 104 are also applied through OR gate 116 and then to OR gate 114 and thus to the monitor signal, block 115. Each of these fault conditions thus is signaled to the external control logic at the office and the monitor step, including such repeat codes to the same station as have been predetermined, is initiated.

The use of unique code formats with the SYNC word and tag bits of fixed or at least partially fixed character, as provided by the system of our invention, thus provides an efficient method for synchronizing the operation between transmitter and receiver locations of a digital data control system over carrier current transmission channels. The BCH code transmission security check added to the synchronizing arrangements further improves the security and efficiency for proper code transmission and reception. Startup and initial delay times resulting from the character of the specific communication system are largely overcome by the SYNC bits preceding the initial code transmission in each direction between the transmitting location and a receiving location. Communication systems with considerable delay or startup characteristic times may thus be utilized when necessary in such a digital data control system. The arrangement of our invention thus provides an efficient and economical manner of controlling remote stations from a single control office by a digital data transmission link.

Although we have herein shown and described but a single arrangement embodying the specific features of our invention, it is to be understood that various modifications and changes may be made therein within the scope of the appended claims without departing from the spirit and scope of our invention.

Having thus described our invention, what we claim is,

1. A synchronizing arrangement for a digital data remote control system, which transmits digital codes, representing control and indication functions, between a control office location and a plurality of remote station locations connected by a communication channel, comprising in combination, a. encoding means at each location coupled to said communication channel for at times supplying a digital data code for transmission to a selected receiving location, b. a check bit generator means at each location controlled by the associated encoding means during code transmission for generating a series of code check bits having predetermined characteristics in accordance with the serial characteristics of the digital data code and for adding the generated check bits for transmission at the end of that code, c. a synchronizing generator means coupled to said channel at each location and responsive to the initiation of a data code transmission for generating a preselected number of synchronizing code bits and for supplying said bits for transmission immediately prior to the transmission of said data code, the final two synchronizing code bits having a predetermined relationship to the characteristic of the final check bit, d. a receiving means at each location coupled to said channel for selectively receiving a code including synchronizing, data, and check code bits transmitted from a remote location and including a shift register means for serially storing the code bits as received, e. the check bit generator means at the receiving location controlled by the associated receiving means during the reception of a code for generating another series of code check bits having said predetermined characteristics in accordance with the serial characteristics of the received digital data code, f. synchronizing logic means at each location controlled by the associated receiving means and check bit generator means and responsive to the reception of a code for recycling the received code bits from the associated shift register means through said associated check bit generator means until the sync code bits are eliminated from the received code bits stored in said associated shift register means, and g. a decoding means at each location coupled to the corresponding receiving means and controlled by the associated synchronizing logic means for recording the function represented by the received data code bits only when the generated check code bits agree with the received check code bits.

2. A synchronizing arrangement as defined in claim 1 in which, a. the synchronizing generator means at said control office location generates seven synchronizing code bits to precede each initial code transmission to a particular station location, the five initial synchronizing bits having predetermined characteristics and the characteristics of the two final bits selected in accordance with a predetermined relationship with the characteristic of the final check code bit, b. the office encoding means inserting six synchronizing tag bits having preselected fixed characteristics at predetermined bit positions within the data code bits, and which further includes at each station location, c. means controlled by the associated receiving means and the associated synchronizing logic means for detecting the characteristics of the tag bits received in a code and coupled for inhibiting the recording of the data code bits by the associated decoding means when the received tag bits have improper characteristics.

3. A synchronizing arrangement as defined in claim 1 in which, the synchronizing generator means at each remote station location generates three synchronizing code bits to precede each initial code transmission to said office location, the first synchronizing bit having a prefixed characteristic and the characteristics of the other two bits selected in accordance with a predetermined relationship with the characteristic of the final check code bit.

4. In a digital data remote control system including a control office and a plurality of stations, each having code transmitter and receiver apparatus connected by a communication channel, the method of synchronizing the transmission of data between a selected transmitter and receiver locations comprising the steps of, a. selecting a plurality of data bits, each with the necessary characteristics to serially encode the data to be transmitted,
b. storing the encoded data bits at the transmitter location in a shift register,
c. cycling the stored data bits through a check bit generator to generate a series of code check bits having characteristics related in a predetermined manner to the serial characteristics of said data bits,
d. transmitting a plurality of sync bits at the beginning of a new period of data transmission from said selected transmitter to said selected receiver to provide channel startup time, a preselected number of the sync bits first transmitted having prefixed characteristics,
e. selecting the characteristic of each remaining sync bit in accordance with a preselected relation to the characteristic of a particular one of said code check bits,
f. serially transmitting the encoded data and code check bits following the sync bits transmission,
g. receiving the transmitted code bits at said selected receiver location,
h. serially storing the received code bits at said receiver location in another shift register,
i. initially cycling the stored code bits, as soon as said other shift register is full, through a receiver location check bit generator to generate another series of transmission code check bits having characteristics related in said predetermined manner to the serial characteristics of the received code bits,
j. comparing the check bits generated at the receiver location with the received check bits,
k. repeating the cycling action and code check bit generation at the receiver location, when the compared series disagree, until all received sync bits are eliminated from said other shift register and the code check bits are generated only from received data bits,
l. successively comparing at said receiver location each generated series of check bits with the received series of check bits until an agreement or a final rejection of the received code bits occurs, and
m. accepting and decoding the received data bits only when two series of check bits agree.

5. The method of synchronizing code transmission as defined in claim 4 in which, for synchronizing the first address code from said office to a selected station, a. seven sync bits are transmitted from the office transmitter preceding the address data code,
b. the characteristics of the first five sync bits are prefixed, and
c. the characteristics of the final two sync bits are selected to be the same as and opposite to, respectively, the characteristic of the final code check bit.

6. The method of synchronizing code transmission as defined in claim 4 in which, for synchronizing the first indication code from a selected station to said office, a. three sync bits are transmitted from the station transmitter preceding the indication code,
b. the characteristic of the first sync bit is prefixed, and
c. the characteristics of the final two sync bits are selected to be the same as and opposite to, respectively, the characteristic of the final BCH check bit.

7. The method of synchronizing the transmission of the first address code from said office to a selected station, as defined in claim 5, further comprising the steps of, a. transmitting from said office six tag bits having prefixed characteristics interspersed among the data bits at preset locations in the code, and
b. decoding said tag bits at the selected station as an integral part of the received data and accepting the received data only when the received tag bits have said prefixed characteristics and the two check bit series agree.

* * * * *